Jan. 26, 1954
A. E. JONES ET AL
AIR NAVIGATIONAL DEVICE FOR COMPUTING
CORRECTIONS FOR TRACK ERRORS
Filed March 20, 1951
2,667,305
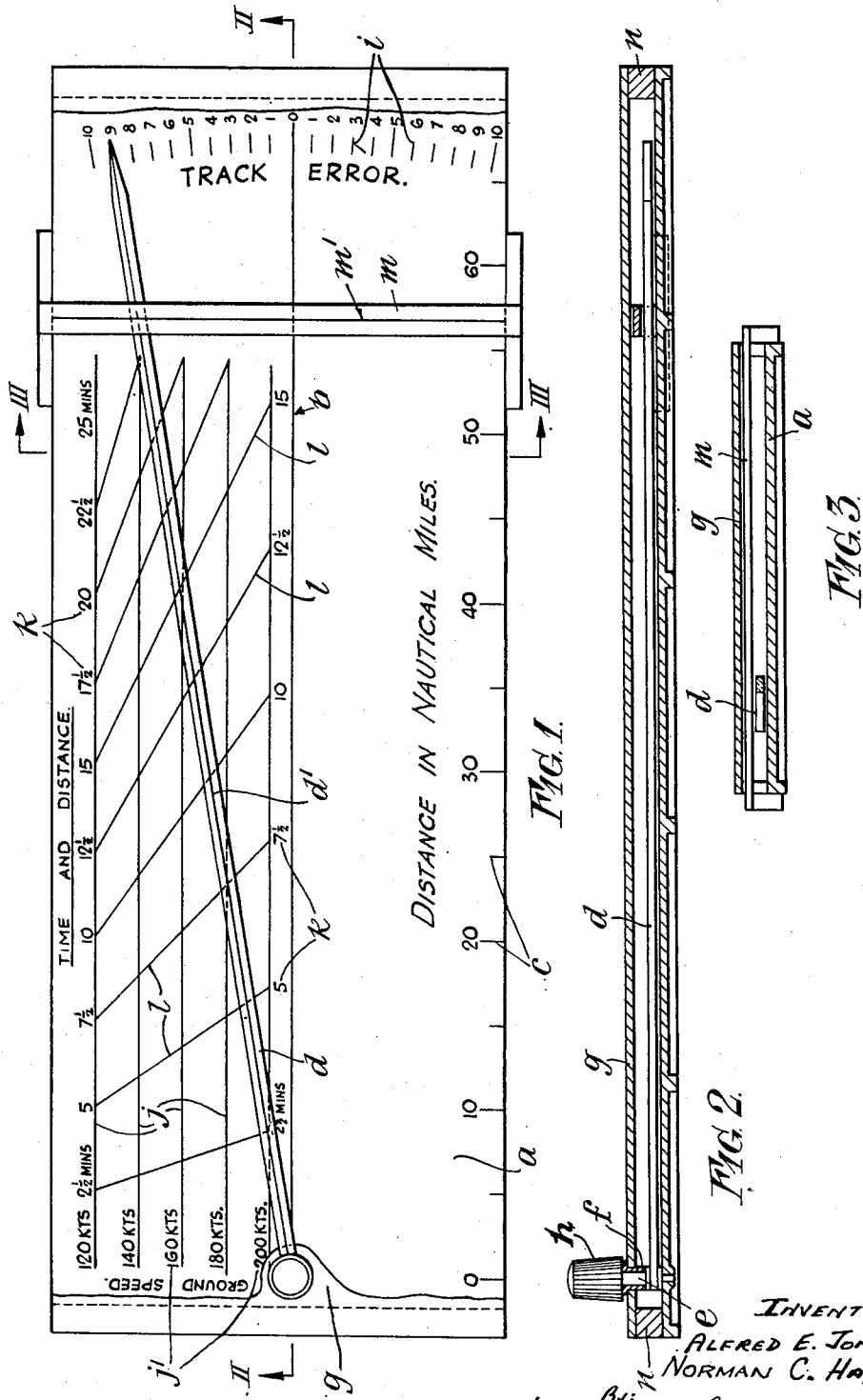
INVENTORS
ALFRED E. JONES
NORMAN C. HAYES
By:
Hauxtine, Lake & Co., AGENTS Patented Jan. 26, 1954

2,667,305

UNITED STATES PATENT OFFICE 2,667,305

AIR NAVIGATIONAL DEVICE FOR COMPUTING CORRECTIONS FOR TRACK ERRORS

Alfred Ernest Jones, Kingston-on-Thames, and Norman Charles Hayes, Worcester, England Application March 20, 1951, Serial No. 216,538

3 Claims. (Cl. 235—61)

This invention relates to a device adapted to be used in conjunction with a chart for making a quick estimation of the correction to be made in course steered by an aircraft in order to bring the aircraft back to a predetermined track or course. The invention is particularly suitable as an aid in the training of aircraft navigators and for use by pilots of private aircraft where it is desired for a quick approximate estimation of the correction to be made to the compass reading to be obtained when the navigator or pilot finds by observation of the terrain being flown over that the he is off course.

The present invention briefly comprises a transparent plate relatively to which is pivotally supported an angularly adjustable arm the plate being scribed or otherwise marked with a line which intersects the pivotal axis of the said arm to indicate against a chart the course to be made good, means with the plate and arm to indicate the angular relationship of the arm and said line, i. e. the track error, and the transparent plate having formed thereon a time and distance chart appropriate to a number of indicated distinctive ground speeds, and a slidable cursor with the plate to assist in the reading of said chart.

At present the principle taught to navigators is for corrections to be estimated on what is known as the "one over sixty rule," the quantity "sixty" being the nearest easy figure for quick calculations to a quantity 57.29 units, e. g. 57.29 nautical miles measured against a chart along the aforesaid line which, if the aircraft is off course 1 unit, e. g. 1 nautical mile, perpendicular to the course to be made good, produces a measurement of one degree of error to be corrected for to bring the aircraft back towards the predetermined course. Clearly, the actual correction to be made on the compass will be twice the indicated error as otherwise a correction identical with the indicated error will merely bring the aircraft on a course parallel with, but off the predetermined course. For example, assuming that the navigator must know his ground speed, he will know that at the expiration of a given time he should be approximately over a certain point on the ground in the true course, but if he sees he is over a point distinctively off the true course he will know the course he is actually making good is wrong, and by comparison on the chart of these two points he will have one factor, i. e. the aforesaid perpendicular dimension and another factor, which can be termed the base of a triangle, i. e. the approximate distance which should have been travelled along the true course or track, and by relating the two dimensions the angle formed between the true course and the course actually being made good can be estimated. Hence, taking the easier figure 60 instead of 57.29 for the base, if he is off the correct track one mile the track error will be approximately one degree, and if he is off two miles the track error will be two degrees and so on. By making an addition or subtraction in the bearing read on the compass of twice the indicated error according to the direction being flown relative to the true course, and flying on the new course for the aforesaid period at the stated ground speed, he will know that he is approximately above the predetermined true course, and thereupon by steering on a course corrected to the original track error he will be back on the true course.

In order that the invention may be clearly understood and readily carried into effect drawings are appended hereto illustrating a simple embodiment thereof, and wherein, Figure 1 is a plan view with a protector plate part broken away.

Figure 2 is a section on the line II—II of Figure 1, and

Figure 3 is a cross section on the line III—III of Figure 1.

Referring to the drawings, the appliance has a base member in the form of a transparent plate $a$ which as shown, can be an oblong piece of durable transparent material, e. g. cellulose acetate, with a longitudinal centre line $b$ engraved to indicate against the chart the track from a given point of origin to a given destination on the chart, and on one side of this line, e. g. along one longitudinal edge of the plate, are engraved graduations $c$ indicating in suitable units the distance in nautical miles or other dimensions covered on the chart by the track line. Pivoted to the plate at one end of the track line is an arm $d$ in the form of a thin rod or needle extending at least the full length of the line, or, as shown, a transparent narrow strip formed with a longitudinal line $d'$ which also may be graduated to indicate distances. This arm $d$ can be fixed to a pivot pin $e$ rotatable in the plate $a$ and in a bush $f$ fixed in a transparent top plate $g$ acting as a shield for the pointer arm, the pin $e$ carrying a knurled knob $h$ by which the pointer arm $d$ can be swung about the pivot axis.

At the end of the plate $a$ remote from the pivot of the said arm $d$ are formed degree graduations $i$ against which the free end of the arm will indicate the track error, assuming that the transparent plate is placed over a chart so that the track line passes through the selected point of origin and the destination point on the chart, and the arm is moved about its pivot so as to intersect a point on the chart over which the navigator finds he is flying.

In conjunction with the foregoing, the transparent plate can be graduated between the track line and one longitudinal edge with a series of equi-distantly spaced parallel longitudinal lines $j$ each marked at one end with a distinctive ground speed $j'$, and the two outermost of such lines are graduated to indicate time intervals $k$, e. g. two and a half minutes between each successive pair of graduations as shown, the spacing of the graduations along one of said lines being narrower than along the other, the former line, e. g. the upper line as shown, indicating a predetermined low ground speed and the other a predetermined maximum ground speed, the intervening lines bearing progressively increasing ground speed indications, e. g. increasing by units of twenty knots. Transverse lines $l$ are engraved on the plate connecting the time interval graduations $k$ along the lowest and highest ground speed lines, and a slidable transverse cursor $m$ is supported bridge fashion across the plate so that by adjusting the datum line $m'$ of the cursor so that it intersects the point corresponding to the position of the aircraft on the chart, assuming the track line is set correctly against the chart, the ground speed can be read off the appropriate scale. In addition the datum line of the cursor can indicate the true course distance travelled from the given point of origin, by reference to the distance scale $c$.

The transparent shield $g$ can be secured over the plate $a$ in narrow spaced relationship thereto, by uniting it to narrow ribs or distance piece strips $n$ at the ends of the plate, the cursor $m$ and adjustable arm $d$ being interposed between the protector plate $g$ and the plate $a$.

The ground speed and time and distance scales are preferably duplicated, i. e. a complete set thereof opposite sides of the centre line $b$.

We claim:

1. A portable air navigational device for use by a navigator when flying for computing corrections for track errors, comprising a transparent rectangular plate to one end of which is pivoted on a fixed axis one end of an angularly adjustable arm extending along the plate, a line scribed or otherwise marked lengthwise along the plate, which line intersects the pivotal axis of the said arm to indicate against a chart the course to be made good, the transparent plate having formed at lengthwise intervals thereon graduations indicating the distance against the chart covered by the said line and also graduations of a trigonometric pre-solved scale to be read against the arm for indicating the track error of the aircraft in degrees relative to the predetermined course, a transverse cursor bar slidable along said plate, and a set of longitudinal distinctive ground speed lines each with a set of time interval markings, each of said latter set of markings having a uniform spacing which is distinctive as compared with any of the other time markings, said cursor bar intersecting both said ground speed lines and said distance graduations.

2. A device according to claim 1, wherein the cursor member and the pointer are interposed between the said transparent rectangular plate and an upper additional transparent plate acting as a cover plate.

3. A portable air navigational device for use by a navigator when flying for computing corrections for track errors, comprising a transparent rectangular plate to one end of which is pivoted on a fixed axis one end of an angularly adjustable arm extending along the greater length of the plate, a line scribed or otherwise marked lengthwise along substantially the longitudinal centre line of the plate, which line intersects the pivotal axis of the said arm to indicate against a chart the course to be made good, the transparent plate having formed at lengthwise intervals thereon graduations indicating the distance against the chart covered by the said line and also at the end of the plate remote from the pivoted axis of said arm graduations of a trigonometric presolved scale to be read against the free end of the arm for indicating the track error of the aircraft in degrees relative to the predetermined course, a transverse cursor bar slidable along said plate, and a set of longitudinal ground speed lines intersected by time interval lines marked on said plate, said time interval lines diverging successively away from each other from a lowest ground speed line terminal position to a highest ground speed line terminal position, all of said latter lines being located on one side of said longitudinal centre line, and the said distance graduations being located on the opposite side of said longitudinal centre line, and all being located so as to be intersected by said slidable cursor.

ALFRED ERNEST JONES.
NORMAN CHARLES HAYES.

References Cited in the file of this patent

UNITED STATES PATENTS

| Number | Name | Date |
|---|---|---|
| 1,294,768 | Carlson | Feb. 18, 1919 |
| 2,425,097 | Isom | Aug. 5, 1947 |
| 2,495,777 | Schroeder | Jan. 31, 1950 |

FOREIGN PATENTS

| Number | Country | Date |
|---|---|---|
| 183,347 | Great Britain | July 27, 1922 |
| 518,830 | Great Britain | Mar. 8, 1940 |

OTHER REFERENCES

Practical Air Navigation, T. C. Lyon; Civil Aeronautics Bulletin, No. 24; 1945, Figure 133, page 170.